United States Patent
Ellis et al.

(10) Patent No.: US 6,551,092 B2
(45) Date of Patent: Apr. 22, 2003

(54) PARISON SEPARATION ASSEMBLY

(75) Inventors: Earle L. Ellis, York, PA (US); David A. Kesselman, York, PA (US); Bernd Klingenmaier, York, PA (US); Jeff Enfield, Felton, PA (US); Roy N. Krohn, York, PA (US)

(73) Assignee: Graham Packaging Company, LP, York, PA (US)

( * ) Notice: Subject to any disclaimer, the term of this patent is extended or adjusted under 35 U.S.C. 154(b) by 192 days.

(21) Appl. No.: 09/760,734

(22) Filed: Jan. 17, 2001

(65) Prior Publication Data

US 2002/0094353 A1 Jul. 18, 2002

(51) Int. Cl.7 .......................... B29C 49/50; B29C 49/36
(52) U.S. Cl. ........................................ 425/531; 425/540
(58) Field of Search ................................ 425/531, 527, 425/806, 540; 264/536

(56) References Cited

U.S. PATENT DOCUMENTS

| | | | | |
|---|---|---|---|---|
| 2,940,121 A | * | 6/1960 | Sherman | 425/531 |
| 3,661,488 A | * | 5/1972 | Latreille | 425/531 |
| 3,752,629 A | * | 8/1973 | Gordon | 425/531 |
| 3,797,985 A | * | 3/1974 | Garver | 425/540 |
| 3,936,263 A | * | 2/1976 | Avery et al. | 425/531 |
| 4,007,244 A | * | 2/1977 | Avery et al. | 425/531 |
| 4,092,389 A | * | 5/1978 | Sakurai | 264/536 |
| 4,696,636 A | * | 9/1987 | Evely | 425/531 |
| 5,480,607 A | | 1/1996 | Hobson | 425/531 |
| 5,585,121 A | | 12/1996 | Morris | 425/527 |
| 5,597,524 A | | 1/1997 | Powell, Jr. | 425/527 |
| 5,787,772 A | | 8/1998 | Weber et al. | 425/531 |
| 5,795,533 A | | 8/1998 | Mehnert | 425/531 |
| 5,910,283 A | | 6/1999 | Hobson | 264/536 |

FOREIGN PATENT DOCUMENTS

JP          61037415 A   *  2/1986   ........... B29C/49/50

* cited by examiner

Primary Examiner—Robert Davis
(74) Attorney, Agent, or Firm—Venable; James R. Burdett

(57) ABSTRACT

A separate parison separation assembly for each parison in a multiple parison blow molding apparatus. Each assembly has a shear plate secured in a recess machined into the mold in order to provide a positive and repeatable location of the shear plate. The shear plate is square and provides eight cutting edges; each of the four sides of the shear plate by rotating the shear plate as an edge wears, and by turning it over. The shear plate has a useful life up to eight times that of the prior art designs. The cut-off knife for each assembly is secured to the other half of the mold, directly on its surface, with a compression pocket cut into the face of this half of the mold to contain and to compress the parison between the mold halves. The design eliminates open space at the edge where the flash forms, reducing the mass of polymer at the edge and thus the temperature of the flash edge.

8 Claims, 3 Drawing Sheets

PRIOR ART

PARISON SEPARATION ASSEMBLY

BACKGROUND OF THE INVENTION

This invention relates to an improved parison separation assembly for use in blow molding machines, and more particularly, to a separation assembly that reduces the amount of polymer formed at the edge of the flash.

As will be appreciated by those skilled in the art, blow molding technology is widely used to manufacture hollow plastic articles, such as containers. A parison is formed by extruding a thermoplastic material and the parison is positioned between the separated halves of a mold. The mold halves are closed around the parison and a separation assembly separates the portion of the parison in the mold from the extruded parison outside the mold. Air is injected into the parison inside the mold to press the outer surface of the parison against the inner surface of the mold. When the object thusly formed cools, the mold is opened and the object is ejected from the mold. FIG. 1 illustrates a blow molding machine of the type used in the art, in which a series of molds are carried on a rotating wheel. In this machine, the parison is inserted from below into each mold when the mold reaches the nine o'clock position in the rotating cycle. The blow molded object cools as the wheel rotates in a clockwise direction. The mold opens, and the object is ejected, when it reaches the six o'clock position.

FIG. 2 illustrates a prior art parison separation apparatus used in a blow molding machine of the type shown in FIG. 1. On one half 12 of each mold a shear plate 14 is secured by machine screws 16 to an outside surface of the mold: On the other half 18 of the mold, a cut-off knife 20 is secured to a plate 22 which raises the cut-off knife so that its lower surface slides over and engages the shear plate 14 when the mold halves close. Screws 21 secure the cut-off knife 20 and the plate 22 to the mold half 18. As the two mold halves are moved together, the leading edge of the cut-off knife 20 contacts the plate 14, and as the mold halves continue to move together, the assembly separates the portion of the parison inside the mold from that outside the mold. While generally satisfactory, this separation assembly has several disadvantages, particularly when used to separate two or more parisons that feed two or more object forming cavities in a single mold. The prior art parison separation assembly is freely mounted on the edge of the mold and this assembly extends to cover the length between two or more parisons, which are each several inches apart. This prior art design, while working well for single parison separation, does not separate dual parison efficiently. One of the problems is the length of the knife assembly. To separate each parison satisfactorily, the knife's specification must be tight beyond reasonable manufacturing expectations. This makes the prior art design expensive with a short life span, as it cannot be resharpened within the tight specifications.

Another problem with the prior art design is high temperature of the polymer at the end of the flash. It generates "strings" which affect ejection. Also, some ejected items stick together as they move downstream and jam the conveyor and/or detabber. This problem is caused by polymer flowing into the open space 23 on both sides of each parison, leaving a mass of material at the edges of the flash, which retains heat.

SUMMARY OF THE INVENTION

An object of this invention is the provision of a parison separation assembly that does not leave stringers, and does not leave a bead of hot polymer attached to the flash.

Another object of the invention is the provision of a parison separation assembly that has a long operating life and provides good separation in multiple cavity, multiple parison blow molding machines.

Briefly, this invention contemplates the provision of a separate parison separation assembly for each parison, each with a shear plate secured in a recess machined into the mold in order to provide a positive and repeatable location of the shear plate. The shear plate is square and provides eight cutting edges; each of the four sides of the shear plate by rotating the shear plate as an edge wears, and by turning it over. The shear plate has a useful life up to eight times that of the prior art designs. The cut-off knife for each assembly is secured to the other half of the mold, directly on its surface, with a compression pocket cut into the face of this half of the mold to contain and to compress the parison between the mold halves. The design eliminates open space at the edge where the flash forms, reducing the mass of polymer at the edge and thus the temperature of the flash edge.

BRIEF DESCRIPTION OF THE DRAWINGS

The foregoing and other objects, aspects and advantages will be better understood from the following detailed description of a preferred embodiment of the invention with references to the drawings, in which.

DETAILED DESCRIPTION OF THE INVENTION

Figure 1:
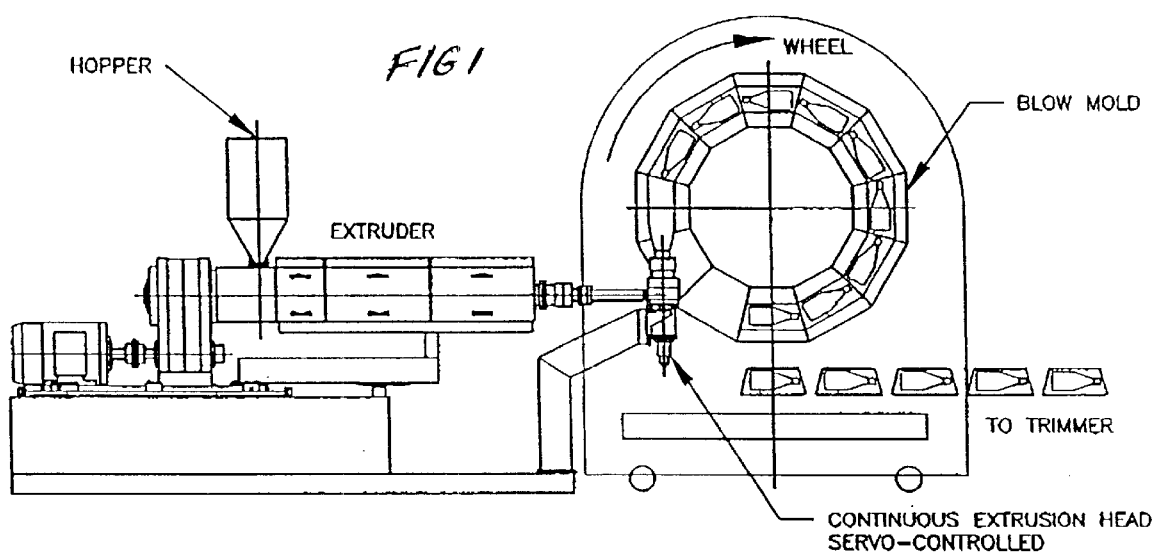
FIG. 1 is a simplified diagram of a blow molding machine, of a type known and used in the art, in which a series of molds are carried by a wheel which rotates to position each at a station where an extruded parison is positioned in an open mold.
Figure 2:
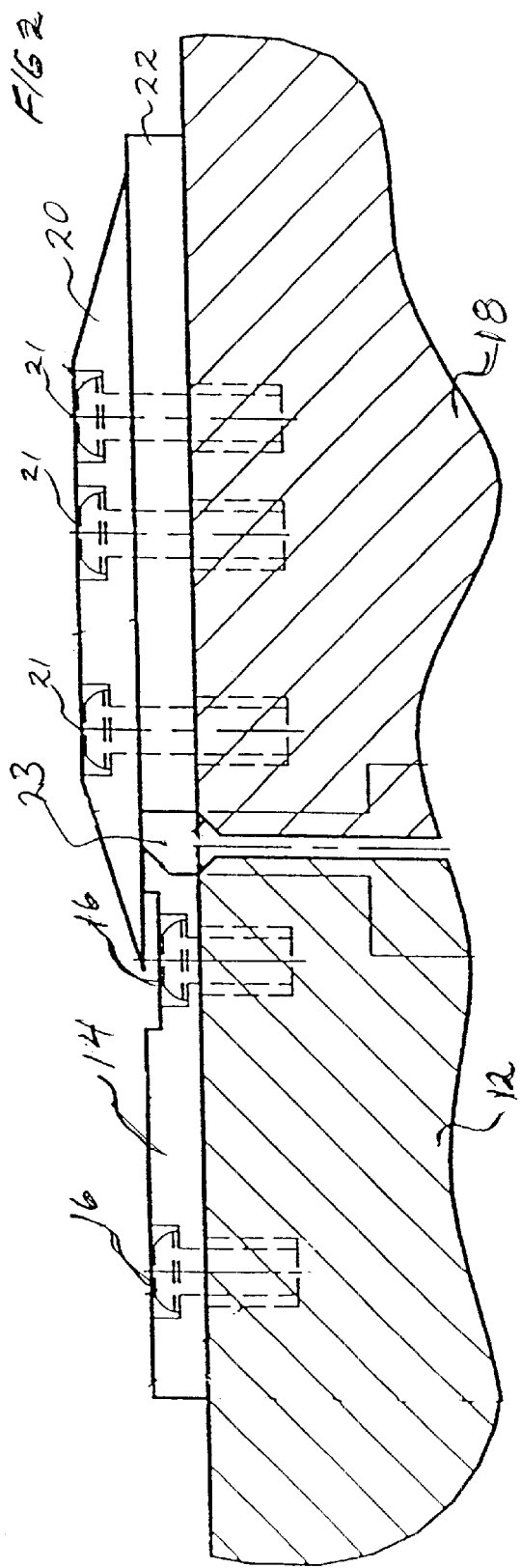
FIG. 2 is a side view, with parts shown in section, of a prior art parison separation assembly.
Figure 3:
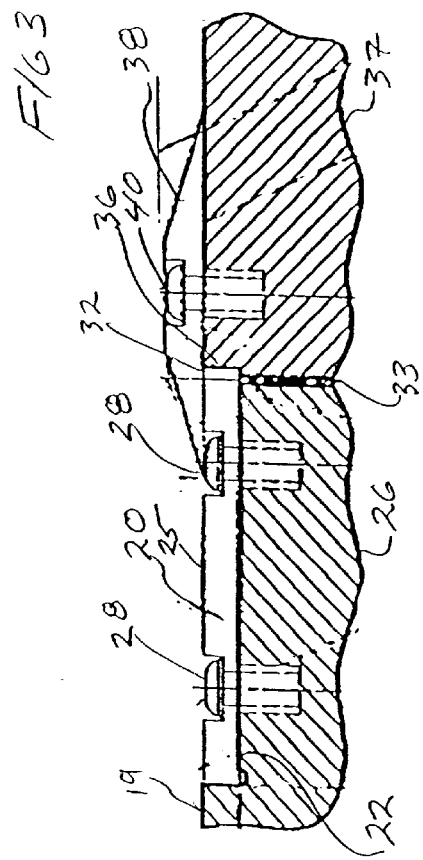
FIG. 3 is a side view, with parts shown in section, of a parison separation assembly in accordance with the teaching of this invention.
Figure 4:
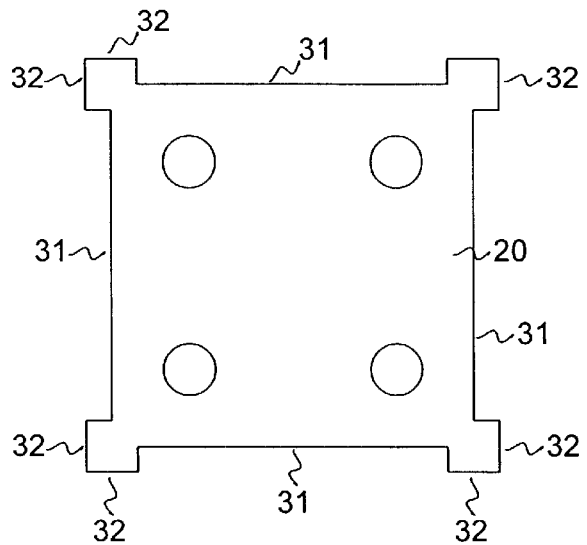
FIG. 4 is a plan view of a separation plate used in the separation assembly shown in FIG. 3.
Figure 5:
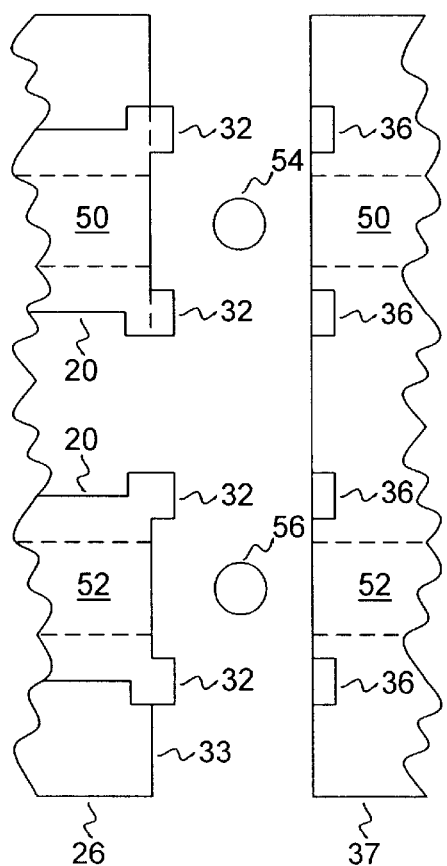
FIG. 5 is a fragmentary, schematic view with the cut-off knife omitted for clarity of illustration, of the separation assembly of this invention, shown in FIG. 3, disposed to separate dual parisons.

Referring now to FIGS. 3, 4 and 5, a square shear plate 20 fits in a recess 22 formed (e.g. machined into) on an outer surface 19 of one half 26 of a mold. The outer surface 25 of shear plate 20 is substantially flush with the outer surface 19 of the mold 26 and the sides of the recess engage the shear plate so that the shear plate can be accurately and repeatedly positioned. The shear plate is shown in FIG. 4. It has a compression tab 32 that extends from each corner. Machine screws 28 secure the plate to the mold. The tabs 32 of the shear plate preferably are tapered. The plate can be rotated four times as it wears, and then turned over and rotated four times more, each time presenting a fresh pair of tabs and a fresh edge 31.

When mounted in the recess in the mold, the tabs 32 of the shear plate 20 extend slightly beyond the inner face 33 of mold half 26 to which it is secured. Notches 36, which form compression pockets, are cut into the other half 37 of the mold, the half to which a parison parting knife 38 is secured by machine screws 40. The edge 31 of the shear plate is aligned with, or slightly set back from, the face 33 of the mold half on which the shear plate is mounted. Here it will be appreciated, the combination of the compression pockets 36 and the mounting of the parting knife 38 with its lower surface flush with the outer surface of the mold, limits the open space at the edge where the flash forms. In order for the compression pocket to be effective in limiting the flow of hot polymer, the tabs 32 on shear plate 20 must be accurately located with respect to the compression pockets 36. This is achieved, in accordance with the preferred embodiment of the invention, by installing the shear plate 20 in the recess 22 machined in the mold. Reducing the mass of polymer at the edge of the flash reduces the temperature of the flash, allowing consistent ejection of the blow molded articles, and prevents the articles from sticking together and jamming downstream equipment.

FIG. 5 illustrates the use of the parison separator of this invention in a multiple parison blow molding machine. In this illustrative embodiment, each mold has two spaced-apart molding cavities 50 and 52 fed by two spaced-apart parisons 54 and 56, respectively. In accordance with the teaching of this invention, an individual separator (only shear plate 20 is shown—the cut-off knife is omitted for clarity) is provided for each cavity.

While the invention has been described in terms of a single preferred embodiment, those skilled in the art will recognize that the invention can be practiced with modification within the spirit and scope of the appended claims.

What is claimed is:

1. A parisons separator comprising in combination:
    a shear plate secured in a recess formed in a surface of one half of a two-piece mold with the outer surface of said shear plate substantially coplanar with the outer surface of the mold;
    a parison separation knife secured to the other half of said two-piece mold and positioned so that the lower surface of said separation knife slides over said outer surface of said shear plate when said two-piece mold closes.

2. A parisons separator as in claim 1 wherein said shear plate has a plurality of sides that allow the shear plate to be rotated to provide a new leading edge as a previous leading edge wears.

3. A parisons separator comprising in combination:
    a shear plate secured in a recess formed in a surface of one half of a two-piece mold with the outer surface of said shear plate substantially coplanar with the outer surface of the mold;
    a pair of tabs on said shear plate extending beyond the face of said one half of a two-piece mold;
    a parison separation knife secured to the other half of said two-piece mold and positioned so that the lower surface of said separation knife slides over said outer surface of said shear plate when said two-piece mold closes; and
    a pair of compression pockets formed in said other half of said two-piece mold to receive respectively said pair of tabs when said two-piece mold closes.

4. A parisons separator as in claim 3 wherein said shear plate is four sided with tabs at each corner so that said shear plate can be rotated to provide a new leading edge as a previous leading edge wears.

5. A parisons separator as in claim 4 wherein the tabs are beveled.

6. In a blow molding apparatus that has multiple article forming cavities in each mold fed respectively by multiple parisons, the combination comprising:
    a separate parison separator for each parison;
    each parison separator including
        a shear plate secured in a recess formed in a surface of one half of a two-piece mold with the outer surface of said shear plate substantially coplanar with the outer surface of the mold;
        a pair of tabs on said shear plate extending beyond the face of said one half of a two-piece mold;
        a parison separation knife secured to the other half of said two piece mold and positioned so that the lower surface of said separation knife slides over said outer surface of said shear plate when said two-piece mold closes; and
        a pair of compression pockets formed in said other half of said two-piece mold to receive respectively said pair of tabs when said two-piece mold closes.

7. A parisons separator as in claim 6 wherein said shear plate is four sided with tabs at each corner so that said shear plate can be rotated to provide a new leading edge as a previous leading edge wears.

8. A parisons separator as in claim 7 wherein the tabs are beveled.

* * * * *